Feb. 20, 1962   G. J. M. G. GARCIA DE LA PARA   3,021,825
INTERNAL COMBUSTION ENGINE
Filed Sept. 30, 1958   5 Sheets-Sheet 1

INVENTOR

GEORGES, JACQUES, MARIE, GASTON GARCIA DE LA PARA

BY
*Ostrolenk, Faber, Gerb & Soffen*
ATTORNEYS

Feb. 20, 1962  G. J. M. G. GARCIA DE LA PARA  3,021,825
INTERNAL COMBUSTION ENGINE
Filed Sept. 30, 1958  5 Sheets-Sheet 2

INVENTOR
GEORGES, JACQUES, MARIE, GASTON GARCIA DE LA PARA

BY
*Ostrolenk, Faber, Gerb & Soffen*
ATTORNEYS

Feb. 20, 1962  G. J. M. G. GARCIA DE LA PARA  3,021,825
INTERNAL COMBUSTION ENGINE
Filed Sept. 30, 1958  5 Sheets-Sheet 5

INVENTOR
GEORGES, JACQUES, MARIE, GASTON GARCIA DE LA PARA
BY Ostrolenk, Faber, Gerb & Soffen
ATTORNEYS United States Patent Office 3,021,825
Patented Feb. 20, 1962

3,021,825
INTERNAL COMBUSTION ENGINE
Georges Jacques Marie Gaston Garcia de la Para,
14 Rue de l'Amiral Courbet, Saint-Mande, France
Filed Sept. 30, 1958, Ser. No. 764,404
Claims priority, application France Oct. 1, 1957
9 Claims. (Cl. 123—51)

This invention relates to internal combustion engines and has specific reference to improvements in engines of this character.

More particularly, it is the object of this invention to provide an internal combustion engine having as its main feature the possibility of operating according to a cycle consisting of four unequal phases and four revolutions of the crankshaft while ensuring the proper timing of the component elements of the engine with one another, whereby the energy developed by the gas expansion may be used with the maximum efficiency; besides, longer phases may be obtained for the induction and power strokes, and shorter phases for the compression and exhaust strokes, respectively.

To this end the mechanical connection between at least one piston and the crankshaft is so designed that the crankshaft makes a complete revolution plus a certain angle during the induction stroke corresponding to the downward movement of the piston in the cylinder, followed by the complement of this second revolution during the compression stroke corresponding to the upward movement of the piston, the power and exhaust strokes being the exact repetition of the induction and compression phases, respectively, from the point of view of kinematics.

Means are provided for urging the piston and connecting-rod assembly in the direction consistent with the engine timing, thus permitting the clearing of aligned dead centers at certain moments of the cycle.

Other features and advantages of this invention will appear as the following description proceeds with reference to the attached drawings forming part of this specification and illustrating diagrammatically by way of example a few forms of embodiment of this invention. In the drawings.

As will be readily understood by one skilled in the art the basic kinematics, that is, the kinematics of the connecting rod 7 transmitting the engine piston efforts to the crankshaft 8, is such that the piston strokes are equal but the angular values of the crankshaft rotation corresponding to these strokes are unequal.

The times are unequal in their effects and the cycle takes place during four revolutions of the crankshaft.

Figure 1:
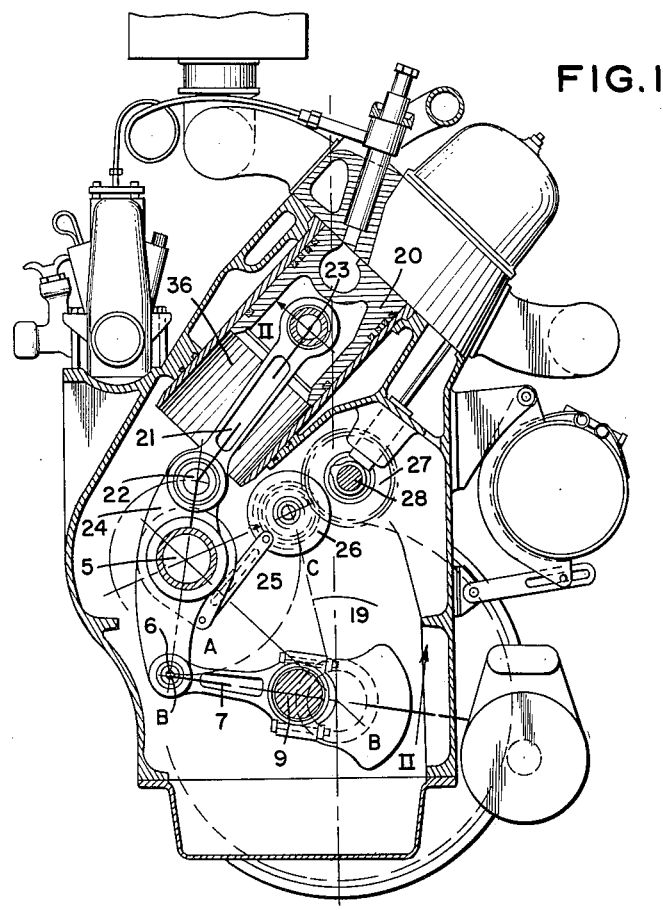
FIGURE 1 is an elevational sect onal view of a four-stroke diesel-type engine.
Figure 2:
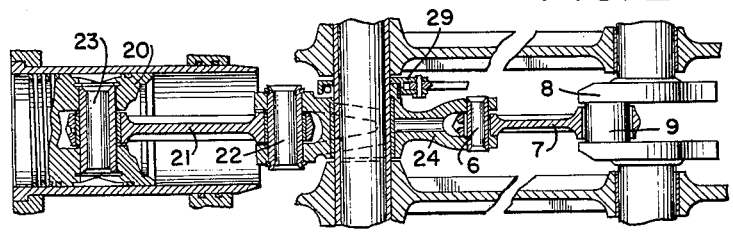
FIGURE 2 is a developed section taken upon the broken line II—II passing through the axes 8, 9, 6, 5, 22, 23 of FIG. 1.

As shown in FIGS. 1 and 2, the engine consists of the following essential component elements: in a cylinder 36 a piston 20 is slidably and tightly mounted and connected to one arm of a rocker 24 by means of a connect.ng rod 21 comprising pivot pins 22 and 23. The rocker 24 is fulcrumed for oscillation on a pivot pin 5. Pivoted on a pivot pin 6 at the outer end of the other arm of rocker 24 is another connecting rod 7 transmitting the engine efforts to the crankpin 9 of a crankshaft 8.

Figure 3:
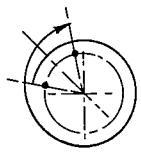
FIGURES 3, 4, 5 and 6 illustrate the angular value of the rotational movement accomplished by the crankshaft for each stroke of the cycle respectively.

According to the kinematics of the reciprocating assembly and the direction of rotation shown by the arrow 19, the values of the angular movements of the crankshaft 8 for each phase or stroke of the cycle are as follows:

*Induction.*—The piston 20 moves down and the rotation takes place through more than one revolution of the crankshaft (see FIG. 3).

Figure 4:
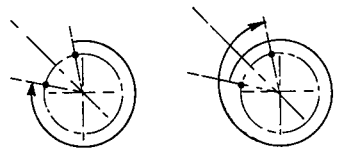

*Compression.*—The piston 20 moves up the cylinder and the crankshaft rotation completes the second revolution (FIG. 4).

Figure 5:
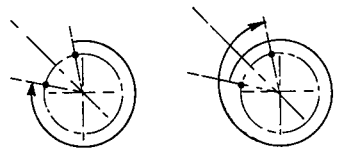

*Power.*—The piston moves down again and the rotation represents again more than one revolution of the crankshaft (see FIG. 5).

Figure 6:
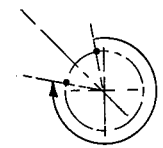

*Exhaust.*—The piston moves up and the rotat on completes the fourth revolution of the crankshaft (see FIG. 6).

The four strokes of the cycle take place during four revolutions of the crankshaft due to the specific arrangement of the crankshaft 8 relative to the rocker 24.

Of course, the valve timing is not taken into account in this description.

The four strokes of the cycle regularized by the flywheel solid with the crankshaft are as follows:

*Induction.*—Considering the crankshaft speed as constant, the induction stroke takes place with a lower piston speed as compared with the compression and exhaust strokes.

This stroke requires more than one revolution of the crankshaft (FIG. 3) for effecting one piston stroke; under these conditions, a relatively slow induction s obtained which improves the coefficient of cylinder filling and the cooling of the piston.

*Compression.*—The compression completing the second revolution of the crankshaft (FIG. 4) is proport on-ally faster. It requires less than one revolution of the crankshaft for accomplishing one stroke of the piston. This improves considerably the fluid tightness, due to the higher piston speed, and the efficiency of this stroke due to the quicker reduction of the compression volume.

*Power.*—This is the only stroke during which turning effort is imparted to the flywheel; consequently, the fullest advantage must be taken from the effects of this stroke.

This phase takes place during more than one revolution of the crankshaft (FIG. 5) and varies in the effort application and in the duration of this application.

*Exhaust.*—The exhaust takes place during less than one revolution of the crankshaft (FIG. 6), that is with a higher piston speed.

The basic kinematics described hereinabove emphasizes the existence of a dead center when the connecting rod 7 is aligned with the pivot axes of rocker 24 and connecting rod 8, as shown diagrammatically in FIG. 9.

This dead center is overstepped during the operation of the engine due to the alternating momentums; but when starting the engine or rotating same with the crank handle the inertias of the reciprocating parts are zero and the small-end 6 of connecting rod 7 may move through the path A—C as well as through the path A—B. Therefore, this inconvenience must be avoided by providing a different timing of the elements with one another.

Figure 7:
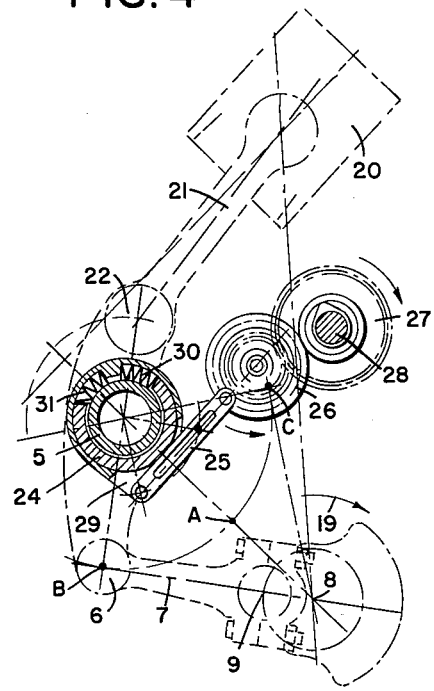
FIGURE 7 is an elevational section showing the engine tim'ng system.
Figure 8:
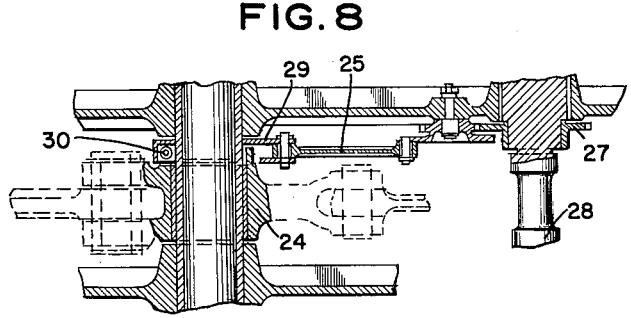
FIGURE 8 is a developed section passing through the different axes of the engine timing system.

FIGURES 7 and 8 illustrate a simple method of clearing the dead center position in the proper direction.

The arm 24 of the rocker effects a rotational movement which is constantly of same angular value, whereas the rotation of the crankshaft 8 which corresponds to this displacement has a different value, as may be inferred from the description of the cycle of operation.

Since the mechanism is driven by the crankshaft 8 it must be capable of absorbing these angular differences while urging the rocker 24 in the proper direction when clearing the dead center A.

The arrangement is as follows:

An arm 29 of special shape is mounted on the same pivot pin 5 as the rocker 24 and is resiliently connected therewith, so that it can absorb the aforesaid angular differences while urging the rocker 24. A pair of coil springs 30, 31 housed in two different cavities as shown in the drawings engage with one end the rocker 24 and with the other end the arm 29. A link 25 interconnects the arm 29 and the disc 26 on which it is pivoted.

This disc 26 acts as a crankshaft driven to turn once for every two revolutions of the main crankshaft 8. Since an operative connection already exists between the crankshaft 8 and the camshaft 28 which, in the example cited, revolves at one-fourth of the speed of crankshaft 8, it will be an easy matter to drive this camshaft 28 through gears 27 inmparting the desired speed to the disc 26.

When cranking up the engine by hand or starting it under normal conditions, the crankshaft 8 drives the disc 26 timed therewith as well as the reciprocating system 7, 24, 21, 20. As the dead center A is being cleared, the operation and arrangement of the system causes the small end of the connecting rod 6 to rotate through the angle consistent with the engine timing.

When the reciprocating system 7, 24, 21, 20 has acquired even the least inertia, the dead center A is cleared automatically in the proper direction.

Of course, many modifications may be brought to this device without departing from the basic principles of this invention. Thus, the link 25 could be pivoted directly on one arm of the rocker 24, provided that it is capable of absorbing by itself the aforesaid angular differences for example by means of a resilient system. Besides, the resilient system could be provided on the disc 26, if desired. It may also be noted that these angular differences could be absorbed by friction systems instead of springs.

Figure 9:
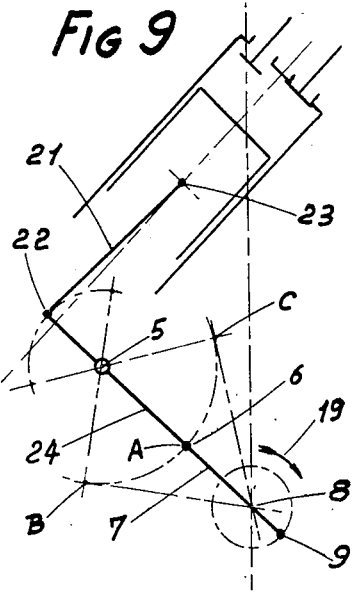
FIGURES 9, 10 and 11 illustrate the method of avoiding the occurrence of aligned joints at certain moments of the engine cycle.

In FIG. 9 it will be noted that when the connecting rod 7 clears the dead center A the four axes 9, 8, 6, 5 are aligned with one another.

Figure 10:
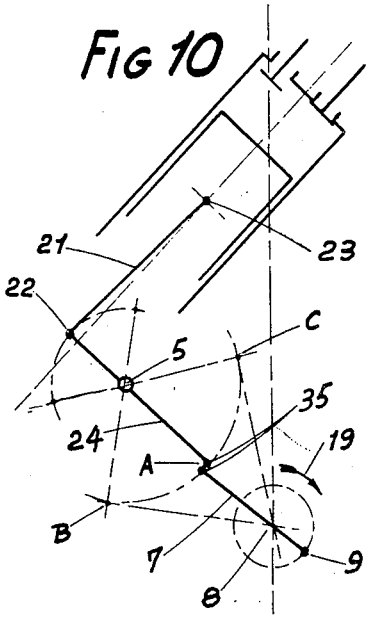
Figure 11:
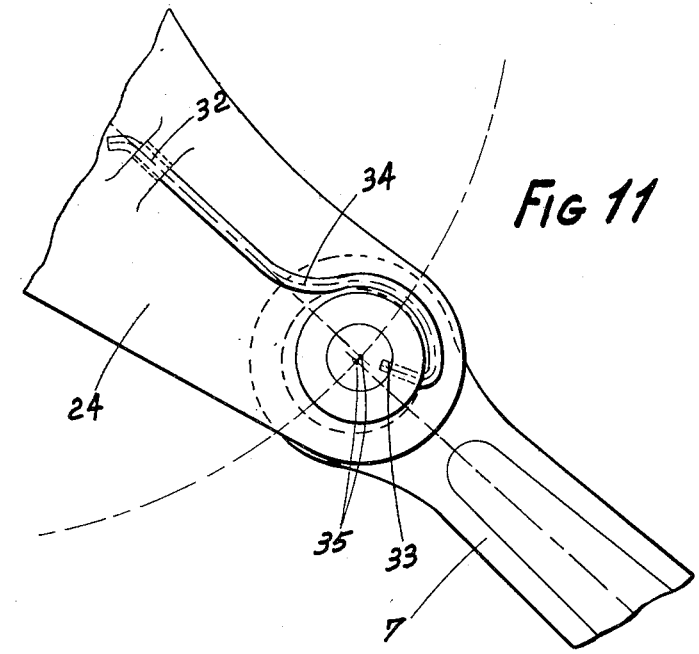

The simple pivot pin 6 may be replaced by an eccentric 35 of very reduced amplitude (FIG. 11) so that the alignment of the joints may be broken as illustrated by the diagram of FIG. 10.

This eccentric 35 behaves like a very short link and is capable of absorbing the expansions while avoiding the necessity of a high degree of machining accuracy due to its permissible oscillation.

Due to the moderate amplitude of oscillation required in this eccentric the latter may remain free but if necessary it will be possible to maintain it in the desired position while permitting its oscillation through the desired angular quantity.

To this end a spring 34 secured on the rocker 24 by one end 32 will engage the eccentric 35 with its other end 33. The resilient means 34 may be so shaped as to permit a certain flexure without permitting the rotation of the eccentric 35.

This eccentric 35 may be positioned as shown in FIG. 10 or on the other side of the arm of rocker 24.

From the arrangement of this engine system it appears that outside the functions of each stroke which are improved as already explained, other very important features are obtained. Thus:

(1) For a given mean piston speed in a conventional engine, the crankshaft speed is nearly doubled in an engine constructed according to this invention.

(2) For a given crankshaft speed in a conventional engine, it is possible to use substantial unitary cylinder displacements and therefore to obtain the whole power output of an engine at a predetermined rated speed with a smaller number of cylinders and ancillary devices.

Each power stroke actuates the crankshaft pin 9 during a considerably greater rotation than in the case of a conventional engine while preserving a satisfactory regularity of the engine torque; it is known that high unitary cylinder displacements, among other known advantages, afford a greater cubic-capacity per minute, in spite of the lower speed deriving therefrom.

Therefore, this engine gives the advantages of considerably increased unitary cylinder displacements without suffering from the inconvenience of the slower speed by which they are usually attended.

It may be noted that for a same crankshaft speed as in a conventional engine the pistons of the engine according to this invention move at a very low mean speed, thus increasing the combustion time and reducing the specific fuel consumption.

(3) The use of the expansion indicator card of an engine is extremely important; in comparison with a conventional engine, the engine according to this invention is considerably improved in this respect.

Figure 12:
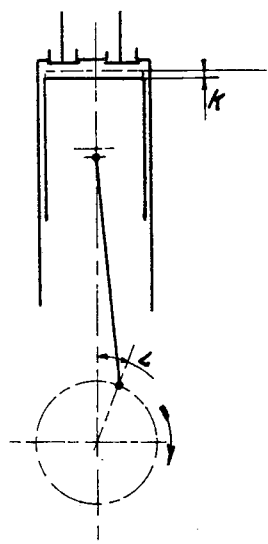
FIGURES 12 and 13 illustrate the advantages deriv'ng from the transmission of the engine effort according to this invention in comparison with the conventional system.
Figure 13:
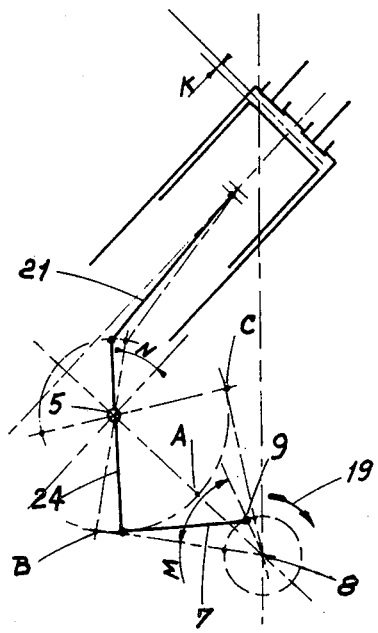

FIGURES 12 and 13 illustrate diagrammatically the difference in the transmission of the engine efforts between a conventional engine (FIG. 12) and an engine constructed according to the teachings of this invention (FIG. 13).

For identical bore and stroke figures a displacement K of the piston, measured from the top dead center gives in the case of a conventional engine a rotation L of the crankshaft (FIG. 12). The same displacement K in the case of an engine according to this invention gives a crankshaft rotation corresponding to the angle M (FIG. 13) which is more than twice the value of the movement obtained with the conventional system.

With the rocker 24 the engine efforts can be applied with a considerable moment relative to its axis 5 when the piston is at its top dead center. In fact, by construction, there is an angle N (FIG. 13) consisting of the arm of rocker 24 and the straight line which, passing through the axis 5, were parallel to the cylinder axis. Thus, the detrimental consequences arising when the crankshaft is in its T.D.C. position are eliminated.

As a result, the maximum transmission moment to the crankshaft and the pressure gradient are improved considerably.

(4) In addition to these advantages concerning the T.D.C., wherein the utilization of the expansion diagram or indicator card is more rational, it will also be possible to utilize the gas expansion (power stroke) during a longer time period by providing a longer stroke than in conventional engines, due to the moderate diameter of the crankshaft relative to the piston stroke.

Figure 14:
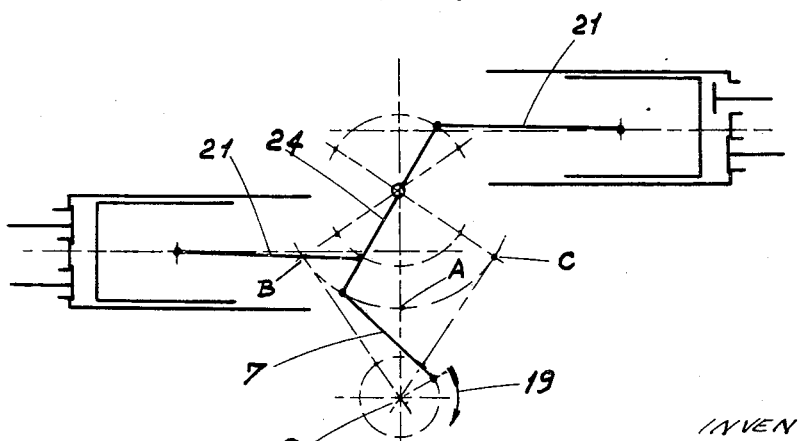
FIGURE 14 is a diagrammatic illustration of an advantageous arrangement of the engine parts.

FIG. 14 illustrates by way of example only and in diagramamtic form the possibility of coupling two cylinders with the same transmission mechanism.

Figure 15:
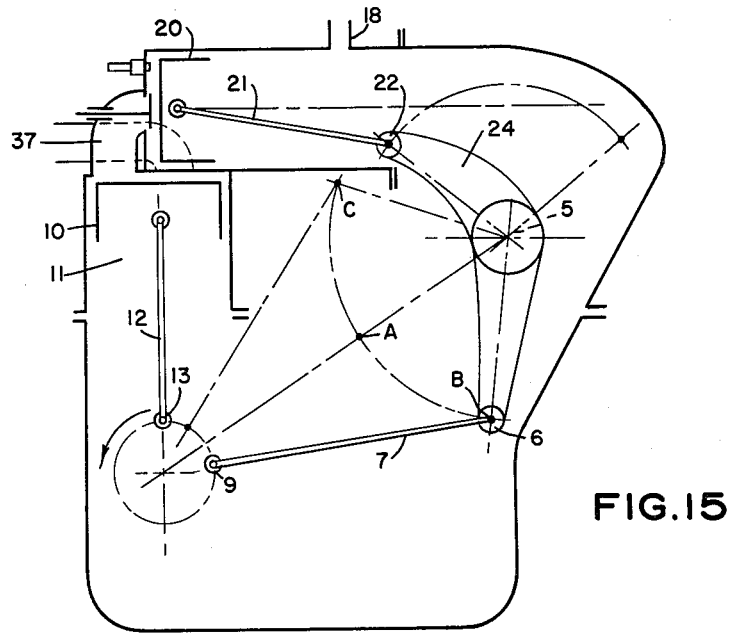
FIGURE 15 is a modified form of embodiment based on the possibilities of the same basic kinematics which permits the construction of a two-stroke engine, the two strokes occurring during two revolutions of the crankshaft, with separate and synchronized feed.

With this method the weight and over-all dimensions of the engine may be reduced to a substantial extent. Other arrangements may be devised from this basic principle and the number of component elements utilized may vary without departing from the spirit and scope of the invention. Thus, FIG. 15 shows a modified form of embodiment concerning a two-stroke engine with separate feed wherein the two strokes take place during two revolutions of the crankshaft.

The basic kinematic arrangement with its method of timing the engine elements with one another is the same as in the case of a four-stroke engine, but in addition it permits the direct, synchronized and metered supply of combustion air to the expansion chambers.

A single feed piston 10 distributes combustion air to two expansion chambers during the cycle (the second expansion chamber is not shown in the diagram). The piston 10 mounted in a cylinder 11 is reciprocated as in a conventional engine. A connecting rod 12 is provided between this piston 10 and a crankpin 13 of the crankshaft.

In the example illustrated the expansion chamber is fed by means of valves and the exhaust takes place through a port 18. The engine may be designed for gasoline or diesel operation, as well as for any other type of fuel.

Figure 16:
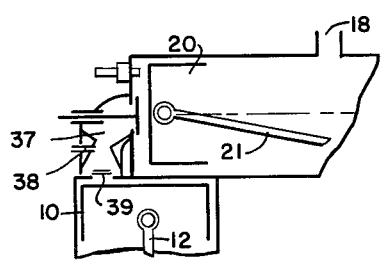
FIGURE 16 illustrates the insertion of a carburetor in the transfer port of the two-stroke gasoline engine shown in diagrammatic form as a detail of FIG. 15.

FIG. 16 shows the possibility (in case of a gasoline engine) of inserting a carburetor 38 in the transfer passage 37. Properly timed valves and an automatic valve 39 control the communication between the various elements during the cycle of operation.

Figure 17:
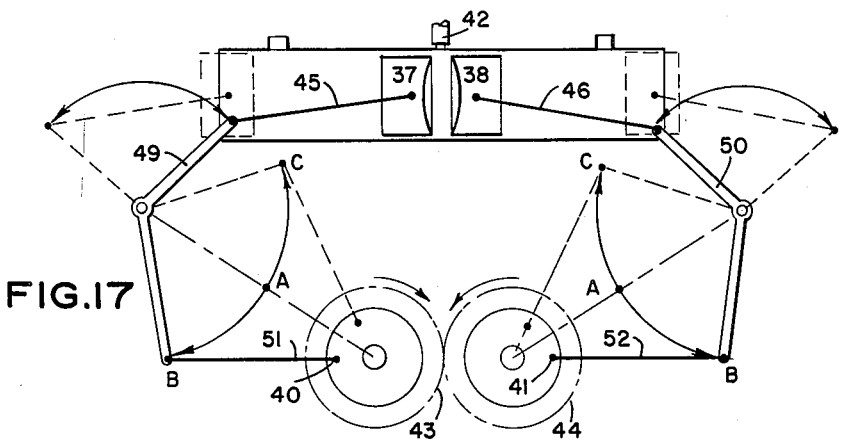
FIGURE 17 illustrates diagrammatically an engine providing two strokes during two revolutions of the crankshaft, this engine having two opposed pistons and two crankshafts interconnected by toothed wheels.

FIG. 17 illustrates diagrammatically another form of embodiment of this invention, which is based on the possibilities offered by the same fundamental kinematic principle.

With this principle it is possible to construct a two-stroke engine provided with a fuel injection system 42, the two strokes being unequal and taking place during two revolutions of a pair of crankshafts driven from corresponding pistons 37, 38.

Each piston 37, 38 is associated to a crankshaft 40, 41 respectively and these are operatively connected with each other by means of a pair of toothed wheels 43, 44 (so that each piston may benefit of the advantages of the cycle taking place in a well-defined direction); the rods 45, 46 of the pistons are connected as in the preceding examples through rockers 49, 50 and connecting rods 51, 52 to the crankshaft.

What I claim is:

1. Internal combustion engine operating according to a cycle comprising four unequal strokes taking place during four revolutions of the crankshaft, which comprises at least one piston, a link pivoted on said piston, a rocker oscillating about a fixed fulcrum and having one side connected to one end of said link, a crankshaft, a connecting-rod disposed between said crankshaft and the other side of said rocker, the relative timing of these elements being such as to cause said crankshaft to rotate through more than one revolution during each downward movement of the piston and through the angle corresponding to the complement of the second revolution during the upward stroke of the piston, an arm resiliently mounted on the fulcrum pin of said rocker, resilient means engaging said rocker and said arm, a disc driven at half the crankshaft speed and a small link connecting this disc to the arm mounted on the rocker fulcrum pin.

2. Internal combustion engine operating according to a cycle comprising four unequal strokes taking place during four revolutions of the crankshaft, which comprises at least one piston, a link connected to said piston, a rocker oscillating about a fixed fulcrum pin and having one side pivotally connected to the end of said link, a crankshaft, a connecting-rod disposed between said crankshaft and the other side of said rocker, the relative timing of these elements being such as to cause said crankshaft to rotate through more than one revolution during each downward movement of the piston and through the angle corresponding to the complement of the second revolution during the upward stroke of the piston, an arm resiliently mounted on the fulcrum pin of said rocker, springs engaging said rocker and said arm, a disc driven at half the crankshaft speed, a small link connecting said disc to said arm, an eccentric pin acting as a link for connecting one arm of said rocker to the crankshaft connecting rod.

3. Internal combustion engine operating according to a cycle consisting of four unequal phases taking place during four crankshaft revolutions, comprising at least one piston having a piston pin, a first connecting rod attached to said piston pin, a rocker oscillating about a fixed fulcrum and having one arm connected to said first connecting rod, a crankshaft, another connecting rod connecting said crankshaft to the other arm of said rocker, the aforesaid elements operatively connected and relatively positioned so as to cause the rotation of said crankshaft through one revolution plus a certain angle during the induction phase and also during the expansion, and through one revolution minus said certain angle during the compression phase, the elements of said engine being proportioned so that for each revolution of said crankshaft there is a time when the points joining said another connecting rod to the rocker and the crankshaft as well as the point joining the rocker to said first connecting rod are arranged in a straight line which extends through the centers of the fixed fulcrum and the crankshaft as well as during the exhaust phase.

4. Internal combustion engine operating according to a cycle consisting of four unequal phases taking place during four crankshaft revolutions, comprising at least one piston having a piston pin, a first connecting rod pivoted on said piston pin, a rocker oscillating about a fixed fulcrum and having one arm connected to one end of said first connecting rod, a crankshaft, another connecting rod connecting said crankshaft to the other arm of said rocker, an eccentric pin acting as a short link and connecting one arm of said rocker to said other connecting rod, the aforesaid elements being operatively connected and relatively positioned so as to cause said crankshaft to rotate through a full revolution plus a certain angle during the induction phase and also during the expansion phase, and through one revolution minus said certain angle during the compression phase as well as during the exhaust phase, the elements of said engine being proportioned so that for each revolution of said crankshaft there is a time when the points joining said another connecting rod to the rocker and the crankshaft as well as the point joining the rocker to said first connecting rod are arranged in a straight line which extends through the centers of the fixed fulcrum and the crankshaft.

5. Internal combustion engine operating according to a cycle consisting of four unequal phases taking place during four crankshaft revolutions, comprising at least one piston having a piston pin, a first connecting rod pivoted on said piston pin, a rocker oscillating about a fixed fulcrum pin and having one arm connected to the end of said first connecting rod, a crankshaft, another connecting rod connecting said crankshaft to the other arm of said rocker, an eccentric pin acting as a short link and connecting one arm of said rocker to said other connecting rod, the aforesaid elements being operatively connected and relatively positioned so as to cause said crankshaft to rotate through a full revolution plus a certain angle during the induction phase and also during the expansion phase, and through one revolution minus said certain angle during the compression phase as well as during the exhaust phase, the elements of said engine being proportioned so that for each revolution of said crankshaft there is a time when the points joining said another connecting rod to the rocker and the crankshaft as well as the point joining the rocker to said first connecting rod are arranged in a straight line which extends through the centers of the fixed fulcrum and the crankshaft, the arrangement of said points in said straight line constituting a dead center, the parts subjected to reciprocating motion having a mass sufficient to ensure the passage of the dead center by inertia.

6. Internal combustion engine operating according to a cycle consisting of two unequal phases taking place during two crankshaft revolutions, comprising at least one cylinder and a piston having a piston pin therein, a first connecting rod pivoted on said piston pin, a rocker oscillating about a fixed fulcrum and having one arm connected to the end of said first connecting rod, a crankshaft, another connecting rod connecting said crankshaft to the other arm of said rocker, an eccentric pin acting as a short link and connecting one arm of said rocker to said other connecting rod, the aforesaid elements being operatively connected, the elements of said engine being proportioned so that for each revolution of said crankshaft there is a time when the points joining said another connecting rod to the rocker and the crankshaft as well as the point joining the rocker to said first connecting rod are arranged in a straight line which extends through the centers of the fixed fulcrum and the crankshaft, the arrangement of said points in said straight line constituting a dead center, relatively positioned and having masses so as to cause said crankshaft to rotate through a complete revolution plus a certain angle during the downward stroke of the piston, and through one revolution minus said certain angle during the upward stroke of the piston, and to clear automatically the dead center, and ports so located in said cylinder as to be uncovered by said piston during the final portion of its downward stroke for induction and exhaust purposes, and an air compressor associated with the engine to supply scavenging air thereto.

7. Internal combustion engine operating according to a cycle consisting of two unequal phases taking place during two revolutions of the crankshaft, comprising at least one piston having a piston pin and slideably fitted within a cylinder, a first connecting rod pivoted on said piston pin, a rocker oscillating about a fixed fulcrum pin and having one arm connected to said first connecting rod, a crankshaft, another connecting rod connecting said crankshaft to the other arm of said rocker, said elements being timed in relation to one another so as to rotate said crankshaft through more than one revolution upon each downward stroke of said piston and through the complement of the second revolution during the upward stroke of the piston, an arm resiliently mounted on the fulcrum pin of said rocker, resilient means bearing on said rocker and said resiliently mounted arm, a plate driven at half the crankshaft speed, a link connecting said plate to said resiliently mounted arm, an eccentric pin acting as a short link and connecting one of the rocker arms to said other connecting rod, and means driven by said engine for supplying scavenging air to said cylinder.

8. Internal combustion engine operating according to a cycle consisting of two unequal phases taking place during two revolutions of the crankshaft, comprising at least two expansion chambers and two pistons having piston pins therein, and members for operatively connecting each piston to a common crankshaft, said members comprising a first connecting rod pivoted on said pivot pin, a rocker oscillating about a fixed fulcrum pin and having one arm connected to said first connecting rod, the crankshaft, and another connecting rod connecting said crankshaft to the other arm of said rocker, said members being timed in relation to one another so as to rotate said crankshaft beyond one revolution upon each downward stroke of said piston and through the complement of the second revolution during the upward stroke of said piston, an arm resiliently mounted on said fulcrum pin of said rocker, resilient means engaging said rocker and said resiliently mounted arm, a plate driven at half the crankshaft speed, a link connecting said plate to said arm mounted on the fulcrum pin of said rocker, an eccentric pin acting as a short link and connecting one of the rocker arms to said other connecting rod, a cylinder and a piston in said cylinder for supplying scavenging air, said piston connected to a connecting rod being actuated from the power crankshaft and properly timed for supplying air to a pair of expansion chambers.

9. Internal combustion engine operating according to a cycle consisting of two unequal strokes during two crankshaft revolutions, comprising a common expansion chamber, two opposed pistons in said chamber, two crankshafts each corresponding to one of said pistons, toothed synchronizing wheels interconnecting said crankshafts, and means for operatively connecting each piston to the relevant crankshaft which comprise a first connecting rod pivoted on the piston pin, a rocker oscillating about a fixed fulcrum pin and having one arm connected to said connecting rod, a crankshaft, another connecting rod connecting said crankshaft to the other arm of said rocker, said members being timed in relation to one another so as to cause said crankshaft to rotate through more than one revolution upon each downward stroke of the relevant piston and through the complement of the second revolution during the upward stroke of the piston, an arm resiliently mounted on the fulcrum pin of said rocker, resilient means engaging said rocker and said arm, a plate driven at half the crankshaft speed, a link connecting said plate to said arm resiliently mounted on said rocker fulcrum pin, an eccentric pin acting as a short link which connects one arm of said rocker to said other connecting rod of said crankshaft.

References Cited in the file of this patent

UNITED STATES PATENTS

| 367,496 | Atkinson | Aug. 2, 1887 |
| 1,755,942 | Woolson | Apr. 22, 1930 |
| 2,392,921 | Holman | Jan. 15, 1946 |

FOREIGN PATENTS

| 521,700 | Belgium | Aug. 14, 1953 |